US008491698B2

(12) United States Patent
Purdy

(10) Patent No.: US 8,491,698 B2
(45) Date of Patent: Jul. 23, 2013

(54) METAL-BASED NANOPARTICLES AND METHODS FOR MAKING SAME

(75) Inventor: Andrew P Purdy, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 382 days.

(21) Appl. No.: 12/815,920

(22) Filed: Jun. 15, 2010

(65) Prior Publication Data

US 2010/0314578 A1  Dec. 16, 2010

Related U.S. Application Data

(60) Provisional application No. 61/187,318, filed on Jun. 16, 2009.

(51) Int. Cl.
 *B22F 9/18* (2006.01)
 *B22F 9/00* (2006.01)

(52) U.S. Cl.
 USPC .............................................. 75/370; 75/343

(58) Field of Classification Search
 USPC ........... 75/343, 351, 362–374, 593, 654–667, 75/671–688, 705, 710, 711, 721, 724–741, 75/953; 428/544–569; 977/773–777, 810; 423/1–209, 462–507
 See application file for complete search history.

(56) References Cited

U.S. PATENT DOCUMENTS

| 6,455,746 B1* | 9/2002 | Dubois et al. | 585/258 |
| 6,855,204 B2* | 2/2005 | Kauzlarich et al. | 117/89 |
| 2007/0290175 A1* | 12/2007 | Kim | 252/500 |

OTHER PUBLICATIONS

Andrew P. Purdy, Joel B. Miller, Rhonda M. Stroud, and Katherine A. Pettigrew, "Aluminum Nanoparticle Synthesis by Reduction of Halides with Na/K," MRS Proceedings, vol. 1056, presented at the MRS Fall Meeting—Nov. 26-30, 2007, published 4-6 months after the Nov. 26-30, 2007 meeting.*
Joel A. Haber and William E. Buhro, "Kinetic Instability of Nanocrystalline Aluminum Prepared by Chemical Synthesis; Facile Room-Temperature Grain Growth," Journal of the American Chemical Society, 120, pp. 10847-10855, published on Web Oct. 13, 1998.*

* cited by examiner

*Primary Examiner* — Scott Kastler
*Assistant Examiner* — Vanessa Luk
(74) *Attorney, Agent, or Firm* — Amy L. Ressing; Roy Roberts

(57) ABSTRACT

The present invention is directed to a method for producing novel metal nanoparticles and nanomaterials. The method involves mixing one or more metal halide starting materials, one or more lithium reducing agent and one or more solvents. In an exemplary embodiment, the resultant metal nanoparticles are substantially free from impurities and have a novel porous and substantially hollow structure.

1 Claim, 12 Drawing Sheets

Trial I, annealed 313°C | Trial I, annealed 313 °C, higher magnification

Trial J | Trial J, higher magnification

Trial J, annealed 285 °C | Trial J, annealed 285 °C, higher magnification

Trial K Al-Fe | Trial K, higher magnification

Trial L Al-V | Trial L, higher magnification

Trial M Al-Zn | Trial M, higher magnification

METAL-BASED NANOPARTICLES AND METHODS FOR MAKING SAME

CROSS-REFERENCE TO RELATED APPLICATIONS

This Application claims the benefit of U.S. Provisional Application 61/187,318 filed on Jun. 16, 2009, which is incorporated herein in its entirety by reference.

BACKGROUND OF THE INVENTION

Absent a 6 nm to 10 nm oxide coating, it is difficult to synthesize nanoparticles of highly reactive metals, such as aluminum. The reactivity of these metals inhibits nanoparticle isolation and passivation.

Currently, aluminum nanomaterials are prepared using various methods, such as ball-milling, electrical exploding wires, condensation from vapor, catalyzed decomposition of $AlH_3$ and chemical reactions of $AlCl_3$ with $LiAlH_4$. In general, these methods produce low purity nanoparticles. Furthermore, the complexity of these conventional synthesis methods precludes large scale industrial nanoparticle production.

For example, Rieke, R. D. and Chao, L., Syn. React. Inorg. Met. Org. Chem. 1974, 4, 101 and Purdy, Andrew A., et al., "Aluminum Nanoparticle Synthesis by Reduction of Halides with Na/K," *Mater. Res. Soc. Symp. Proc.*, 2008, vol. 1056, HH03-18 each teach methods for reducing aluminum halides using a sodium potassium alloy under sonication to produce small nanoparticles. These sodium potassium compounds, however, are ineffective for reducing many aluminum compounds such as amides. However, it is difficult to remove potassium salts, such as KCl and KBr, and other byproducts of the reduction reaction from the resulting aluminum nanoparticles, thereby producing salt-contaminated aluminum nanoparticles, or making the isolation of pure nanoparticles excessively expensive, time consuming, and non-scalable. Additionally, passivation of the resultant aluminum nanoparticles using glycerol or in-situ generated fluorocarbon shells is only partially effective.

Purdy, Andrew A., et al., "Aluminum Nanoparticle Synthesis by Reduction of Halides with Na/K," *Mater. Res. Soc. Symp. Proc.*, vol. 1056, 2008, HH03-18 further teaches a method for producing aluminum nanoparticles by reducing aluminum amide, $Al(N(SiMe_3)_2)_3$, using lithium powder. The article, however, only contemplates nanoparticle production by the reduction of aluminum amides, rather than aluminum halides, using lithium powders. Evaluating the effectiveness of the lithium for reducing other reactive metal complexes, it was determined that lithium is unable to produce aluminum nanoparticles when reacted with aluminum butoxide.

Other publications, such as Haber, Joel and Buhro, William, "Kinetic Instability of nanocrystalline Aluminum Prepared by Chemical Synthesis; Facile Room-Temperature Grain Growth," *J. Am. Chem. Soc., vol.* 120, 1998, 10847 teach methods for producing aluminum nanoparticles by reacting $AlCl_3$ with $LiAlH_4$ and subsequently removing LiCl byproduct with MeOH. This process involves the generation and subsequent decomposition of alane, $AlH_3$, to aluminum nanoparticles and hydrogen. Also, the LiCl byproduct is difficult to remove by the methods used in the article since MeOH reacts with aluminum, and results in low purity aluminum nanocrystalline products.

Therefore there is a need to develop an effective synthesis method for producing pure nanoparticles of reactive metals that addresses the deficiencies of the prior art.

BRIEF SUMMARY OF THE INVENTION

In one aspect, the invention is directed to a method for producing metal nanoparticles involving the process of combining a metal halide starting material, lithium and solvent to form a mixture, from which metal nanoparticles are formed by reduction of the metal halide starting material.

In another aspect, the invention is directed to a metal nanomaterial including a plurality of porous and substantially hollow microspheres that are constructed from loosely assembled nanoparticles. The microspheres are produced by the process of combining a metal halide starting material, lithium and solvent to form a mixture and forming the metal particles by reduction of the metal halide in the mixture.

In a third aspect, the invention is directed to a metal nanomaterial including a plurality of porous and hollow microspheres, wherein said microspheres are substantially free from impurities and comprise a reactive metal These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE INVENTION

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Moreover, the terms "a" (or "an"), "one or more" and "at least one" can be used interchangeably herein. It is also to be noted that the terms "comprising", "including", "having" and "constructed from" can be used interchangeably.

Figure 1:
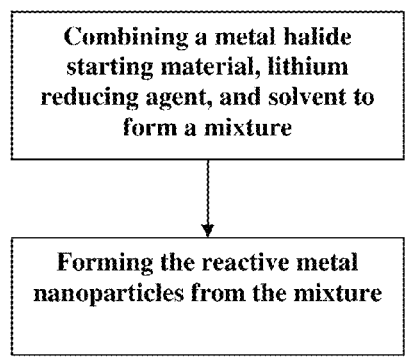
FIG. 1 is a flow chart illustrating an exemplary method for synthesizing metal nanoparticles by reducing a metal halide starting material.
Figure 2:
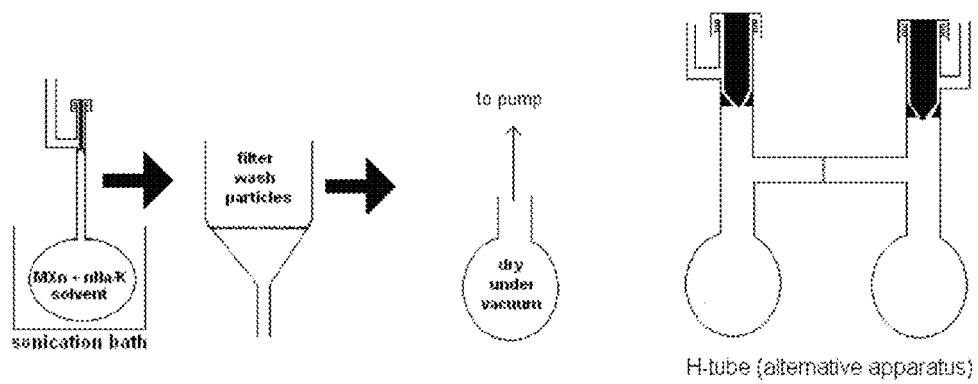
FIG. 2 is a schematic representation of the apparatus used for the synthesis. The Pyrex H-tube apparatus shown in the rightmost portion of FIG. 2, is an alternative apparatus that was used for the larger scale trials.

Referring now to the drawings, wherein like reference numerals designate corresponding structure throughout the views, and referring in particular to FIG. 1, the invention is directed to a method for synthesizing metal nanoparticles, particularly nanoparticles of reactive metals. The method involves chemically reacting one or more metal halide starting materials, one or more lithium reducing agents, and one or more solvents to form a mixture. Optionally, the mixture is sonicated to facilitate reduction of the metal halide and increase the rate of chemical reaction. From the chemically reacted mixture, metal nanoparticles are formed and isolated. This method may be used to produce small, porous and substantially hollow metal nanostructures, which may optionally be impregnated with one or more chemicals.

According to the method illustrated in FIG. 1, the first step of the method involves combining metal halide starting materials with one or more lithium reducing agents and one or more solvents to form a mixture. A metal particle slurry is formed when the components of the mixture are allowed to react. During the reaction, the metal halide starting material is reduced by lithium. Optionally, the mixture can be sonicated via a sonic/ultrasonic bath, sonic/ultrasonic horn or other sonic/ultrasonic resonators, to facilitate completion of the reduction reaction. In an exemplary embodiment, the mixture is sonicated for a period from about 2 to about 120 hours, more preferably, from about 2 to about 24 hours. The required sonication time may depend on the solvent employed for the reaction.

The reaction can be conducted in a Pyrex reaction bulb, or an H-tube, or in larger vessels made of steel or other metals for industrial scale-up. The filtration and washing of the product can be done inside an inert atmosphere dry box, inside a Pyrex H-tube designed for this purpose, inside a Soxhlet extractor, or in a metal apparatus designed for filtering and washing large quantities of material under inert atmosphere with recovered or re-condensed solvent. A metal apparatus is the preferred embodiment for industrial scale-up. Sonication times can be anywhere from less than an hour to many days depending on the reaction being conducted, the solvent being used, and the desired degree of reaction completeness.

The duration of the chemical reaction, ease in isolating the metal particles, nanoparticle size, nanoparticle yield and scalability are dependent on the selected metal halide starting materials and solvents. Exemplary metal halide starting materials include metal monohalides (MX), metal dihalides ($MX_2$), metal trihalides ($MX_3$) and substituted metal halides ($R_nMX_{y-n}$ or $R_nMX_{y-n}$), where M is a metal atom, X is a halide atom, y is the valence of the metal, n is the number of halide atoms and R is selected from the group consisting of an aryl group, alkoxy group having 1-20, more preferably 1-10, and most preferably 1-5 carbon atoms or a dialkylamino group wherein the alkyl groups have 1-20, more preferably 1-10, and most preferably 1-5 carbon atoms. Mixed metal halides such as $MAlCl_4$ and metal cluster halides can also be used. Mixtures of metal halides and/or substituted metal halides having different metals, degrees of halide replacement by —OR groups and/or different halides may also be employed, and substituted metal halides can be produced in situ by combining halides and alkoxides and/or amides, for example 2 eq of $AlCl_3$ and 1 eq $Al(OR)_3$ produces 3 eq of $AlCl_2(OR)$, and combination of $AlCl_3$ with $B(OEt)_3$ produces a statistical mixture of several possible aluminum and boron chloride-alkoxides.

In one embodiment, the metal halide starting material includes one or more metals selected from the group consisting of Al, Be, Si, Ti, V, Fe, Zn, In, Bi, Ga, In, B and combinations thereof. The halides should be fully soluble in the solvent at the concentrations employed in the reaction. The halides are preferably selected from the group consisting of halides of Cl, Br, I and combinations thereof.

Without being bound by theory, it appears that the size of the metal nanoparticles depends, to some extent, on the number of non-halide substituents per metal atom that are reduced during the reaction, with a greater number of non-halide ligands producing smaller nanoparticles. Thus, the size of the resultant metal nanoparticles may be reduced by substituting one or more of the halogen atoms with one or more non-reducible groups, such as aryl, alkoxy or dialkylamino groups, or by co-reduction with fluorocarbon. The halide substitution caps the particle size by slowing the reduction reaction rate by a factor of up to about 10, thereby inhibiting grain growth. Exemplary halide substitutions include $AlBr_2OCMe_3$, $AlBr_2OCEt_3$, $CH_2(AlBr_2)_2$, $AlCl_2NMe_2$ or $MesitylAlCl_2$, $AlCl_2OEt$ The size of the nanoparticles or crystalline domains is reduced considerably when an aluminum trihalide, for example $AlCl_3$, is co-reduced with another metal or main group element halide. For example, when $AlCl_3$ is co-reduced with $SiCl_4$, the aluminum nanoparticles are an average of 27 nm as compared to >100 nm when $AlCl_3$ is reduced alone.

The reducing agent employed in the present invention is lithium. Lithium is capable of effectively reducing a wide range of metal halides. Notably, lithium is capable of reducing metal compounds for which conventional reducing agents, such as Na/K, are ineffective. Typically, the lithium reducing agent is in the form of lithium powder. The lithium powder used was obtained by washing the oil from a commercial lithium dispersion. Commercial lithium dispersions typically contain a very small amount of sodium, but this reaction should work equally well with sodium-free lithium powder.

Any amount of lithium reducing agent relative to the metal halide starting material may be employed. Preferably, at least a stoichiometric amount of lithium reducing agent is employed to ensure that substantially all of the reducible groups are reduced during the reaction. In an exemplary embodiment, a stoichiometric amount or more of lithium reducing agent sufficient to fully reduce the metal halide starting material is mixed with the metal halide starting material. The number of halide groups on the metal halide starting material determines the stoichiometric amount of lithium. For example, when the metal halide starting material is $AlCl_3$, a stoichiometric amount of the lithium reducing agent to the $AlCl_3$ is 3. Preferably, the method of the present invention employs at least a stoichiometric amount of lithium or more. In the case of $AlCl_3$ preferably about 3-4Li per $AlCl_3$ is employed.

An amount of Li in excess of the stoichiometric amount necessary to reduce the metal halide starting material can be used to produce an intermetallic compound, LiM in addition to the metal nanoparticle material. The presence of the additional intermetallic compound in the resultant nanoparticles may be advantageous in some embodiments. For example, when the metal nanoparticle is to be used as part of a combustible fuel, the presence of an intermetallic compound, such as LiAl, with high combustion energy and fast combustion kinetics, may be desirable.

One or more solvents may be used to facilitate the reduction of the metal halide with the lithium reducing agent. Exemplary solvents include ethereal solvents, such as diethyl ether, dimethyl ether and the glyme ethers including but not limited to monoglyme and diglyme and hydrocarbon solvents such as toluene. The use of tetrahydrofuran is not preferred with aluminum as excessive cleavage of the solvent occurs. An ethereal solvent with a plurality of ether functionalities is preferred when the metal halide has low solubility in diethyl ether. Hydrocarbon solvents such as toluene can be used when the metal halide is soluble in that solvent, but the reaction goes much more slowly in hydrocarbons, and does not proceed at an appreciable rate without sonication. Suitable hydrocarbon solvents include toluene, benzene, xylene, hexane, heptane, pentane, and any similar compound.

One or more additives may also be employed during the reaction to alter the properties of the resultant nanoparticles. Suitable additives may include lithium compounds such as lithium alkoxides, aluminum-containing alkoxides and amides, and boron alkoxides. In an exemplary embodiment, the presence of an additional additive allows for in situ substitution of the halides of the metal halide starting material during the reduction reaction to thereby reduce the size of the resultant nanoparticles as discussed above.

The formed metal nanoparticles may be subsequently isolated, by removal of byproducts of the reduction reaction or impurities removed. Filtering the metal nanoparticle slurry from the mixture and washing the nanoparticle slurry with an organic solvent capable of dissolving salts and other reaction byproducts may accomplish this. Because lithium halides are readily soluble in many ethereal and other polar organic solvents, they can be easily and substantially completely removed from the metal nanoparticle slurry without exposing the product to water or other protic or reactive solvents. In an exemplary embodiment, the solvent is a non-protic solvent, such as tetrahydrofuran (THF).

The resultant metal nanoparticles are substantially free from impurities. Preferably, the concentration of the metal reduced from the metal halide in the resultant metal nanomaterial is about 90% or more, more preferably, about 95% or more. Therefore, unlike the conventional methods, the metal nanoparticles can be substantially isolated.

To facilitate handling in air or an oxidative environment, the metal nanoparticles can optionally be passivated to air and moisture by coating the isolated metal nanoparticles with a passivator, such as glycerol, sorbitol, carbohydrates, fluorinated ligands, an oxide and cross-linked shells. Passivation may occur after the metal nanoparticles have been isolated. Alternatively, passivation may be accomplished in situ during the reduction reaction or may be performed by forming an oxide layer on the nanoparticles through controlled air exposure.

The resultant metal particles have a novel substantially hollow and porous nanostructure. In an exemplary embodiment, the metal particles are configured as small, hollow and porous microspheres composed of nanoparticles and/or nanorods loosely stuck together, or as partially consolidated nanoporous materials in the form of flakes or irregular balls. Each microsphere or flake can have a diameter of about 50 microns or less, preferably, about 15 microns or less, more preferably, about 5 μm to about 15 μm, and most preferably, about 5 nm to about 10 μm Each particle can be constructed from about 5 nm to about 320 nm grains.

Optionally, these substantially hollow particles can be filled or impregnated with one or more chemicals. The particle may be filled with any solid, liquid or gaseous material. In an exemplary embodiment, the metal particle is impregnated with combustible materials, such as oxidizers, to form combustible products which release a large amount of energy in combustion reactions. This encapsulation of the combustible material provided by the metal particles provides for a more uniform and completes mixture between the metal and combustible material which facilitates the combustion reaction. It is envisioned that the morphology of the particles may also be useful as a novel delivery system for a variety of materials.

In addition to producing small, high purity, porous and substantially hollow metal particles, the synthesis method of the present invention provides a number of advantages. Namely, the use of lithium as the reducing agent enables the reduction of a wide variety of metal halides. Additionally, lithium salt byproducts can be easily and substantially completely removed with organic solvents, thereby enabling the process to be scaled-up for industrial production. The method and resultant metal particles also have a wide range of applications. In particular, the invention may be used to produce highly effective combustible products. The large porosity could enable the use as hydrogen storage materials or as reactive catalysts.

EXAMPLES

Example 1

Figure 3:
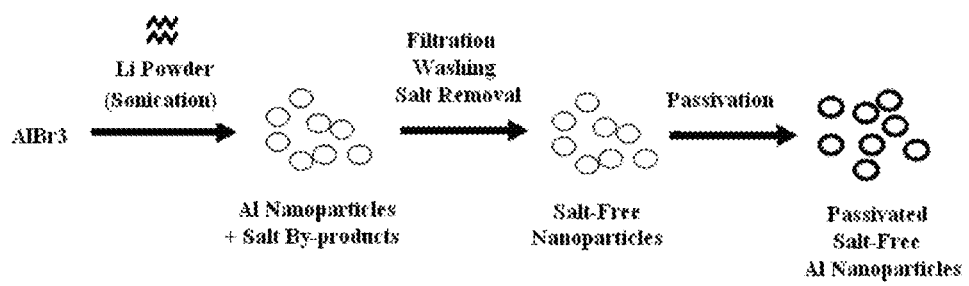
FIG. 3 is a schematic diagram illustrating the production of Al nanoparticles from the reduction of $AlBr_3$ with Li powder.
Figure 4:
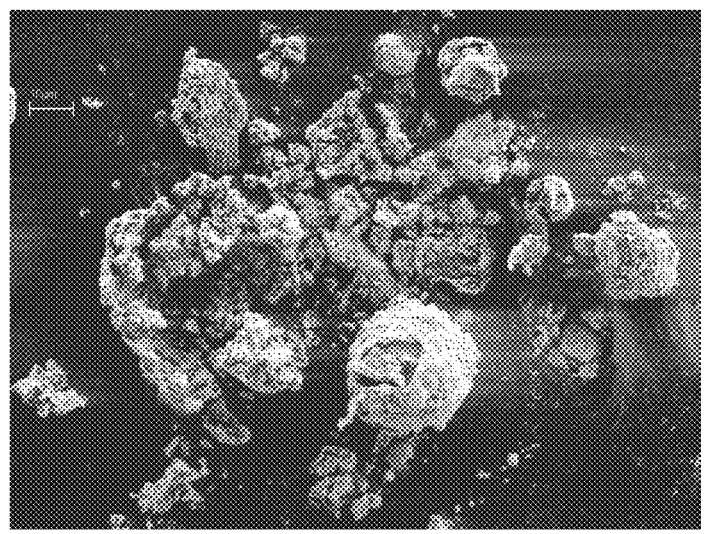
FIG. 4 is an SEM image of aluminum nanoparticles produced by the synthesis process illustrated in FIG. 3, using a reaction of $AlBr_3$ with Li powder.
Figure 5:
FIG. 5 is a higher magnification SEM image of the same aluminum nanoparticles as shown in FIG. 4, which were produced by the synthesis process illustrated in FIG. 3.

As shown in FIG. 3, a plurality of hollow aluminum microspheres were synthesized by adding Li powder to a solution of $AlBr_3$ in dry diethyl ether over a period of 20 minutes (Trial A, Table 1). The components were mixed together under inert atmospheric conditions inducing a vigorous and spontaneous chemical reaction, and sonicated for about 24 hours. The sonication was begun after the vigorous reaction had subsided. The resultant slurry was filtered from the mixture. Li halide byproducts were removed by washing the slurry with THF and ether. The isolated aluminum particles were configured as a plurality of porous microspheres about 5-10 μm in diameter. Each microsphere was constructed from about 50 to about 320 nm grains that were primarily composed of aluminum but also contained LiAl. SEM images of the aluminum microspheres are shown in FIGS. 4-5.

Figure 8:
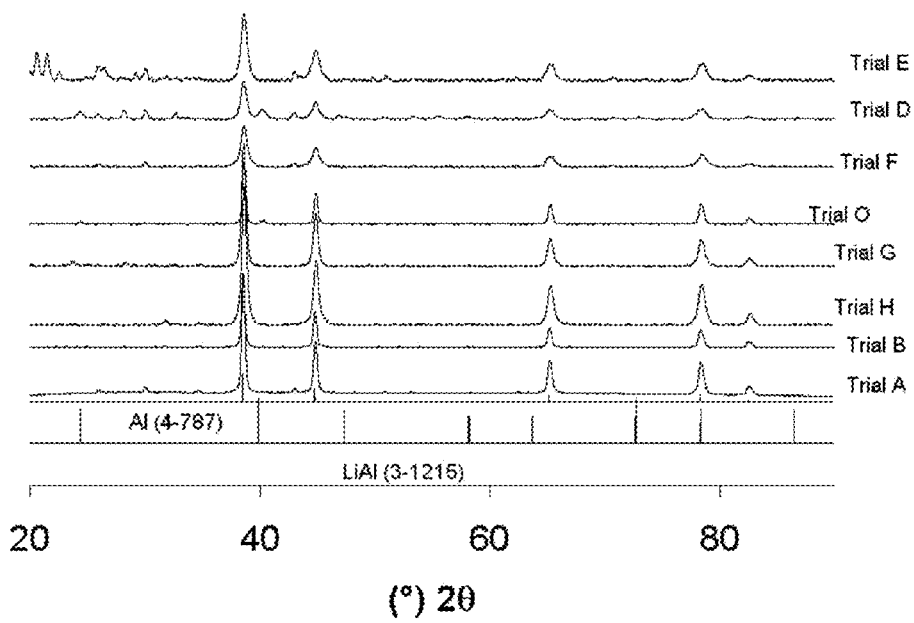
FIG. 8 shows x-ray diffraction spectra of aluminum nanoparticles produced by the reduction of $AlCl_3$ and $AlBr_3$ with Li powder, for the experiments described in Table 1, Trials A, B, D-H, and O.

A similar reaction with toluene solvent was performed in Trial O. In this trial, the reaction was not spontaneous, and thus the mixture had to be sonicated for 2 days. The reaction produced clumps which were repeatedly washed with dry THF to afford Al and LiAl particles. The XRD patterns are shown in FIG. 8.

Example 2

Figure 6:
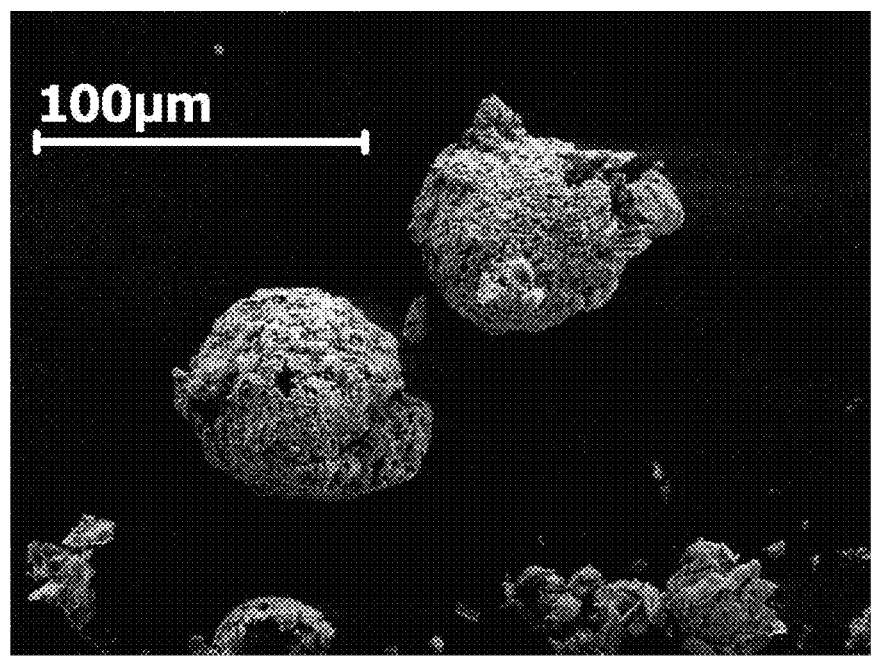
FIG. 6 is an SEM image of aluminum nanoparticles produced by the reduction of $AlCl_3$ with Li powder.
Figure 7:
FIG. 7 is a higher magnification SEM image of aluminum nanoparticles of FIG. 6, which were produced by the reduction of $AlCl_3$ with Li powder.

A plurality of hollow aluminum microspheres were synthesized by adding Li powder to a solution of $AlCl_3$ in diethyl ether over a period of 20 minutes (Trial B). The components were mixed together under inert atmospheric conditions and sonicated for about 24 hours, inducing a vigorous and spontaneous chemical reaction. The resultant slurry was filtered from the mixture. Li halide byproducts were removed by washing the slurry with THF and ether. The isolated aluminum particles were configured as a plurality of porous and hollow microspheres of about 5-10 μm in diameter. Each microsphere was constructed from about 50 to about 320 nm grains that were primarily composed of aluminum but also contained LiAl. SEM images of the aluminum microspheres are shown in FIGS. 6-7. The XRD pattern is shown in FIG. 8.

Figure 9:
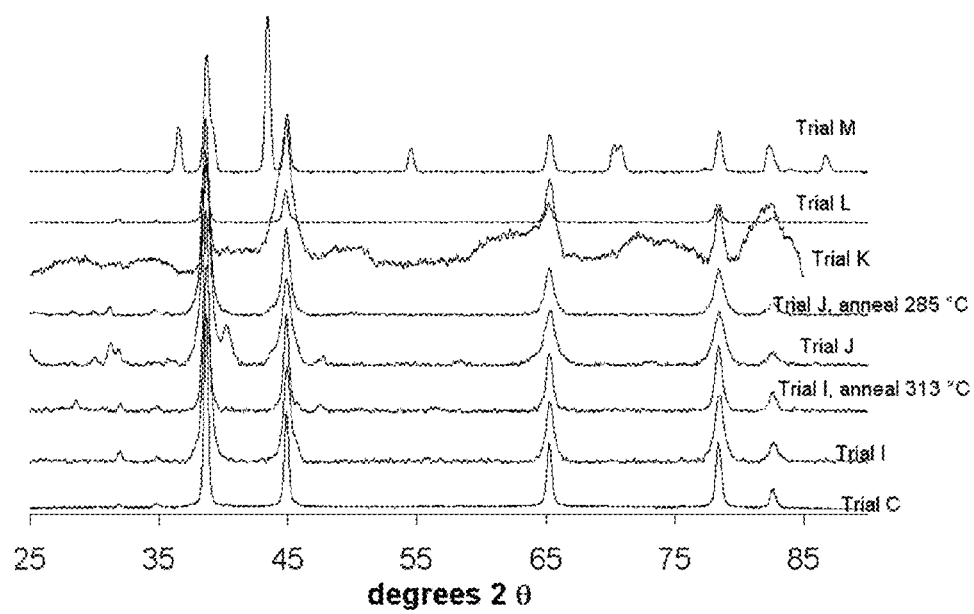
FIG. 9 shows x-ray diffraction powder patterns of the product of co-reduction between $AlCl_3$ and the compounds of other metals, for the experiments described in Table 1, Trials I-M.

A larger scale reaction is Trial C. The Li powder was slowly added in an inert atmosphere to a solution of the $AlCl_3$ in ~75 mL ether over 1 hour, with periodic agitation. The reaction was done in one side of a large H-tube, with each side connected by a fine frit. After all boiling subsided, the reaction was sonicated for 3 days, and then filtered. The ether was removed and replaced with THF, and the LiCl was washed out. After each wash, the THF was re-condensed on the product side and the wash was repeated a total of 7 times. The XRD patterns of the larger scale reactions are shown in FIG. 9.

Example 3

Aluminum particles were prepared according to the method of the present invention using the aluminum halide starting materials, lithium powder as the reducing agent and additives, as shown in Table 1, trials D-H. FIG. 8 shows an XRD powder pattern of the resultant aluminum particles in trials A, B, D-H, and O.

Figure 10:
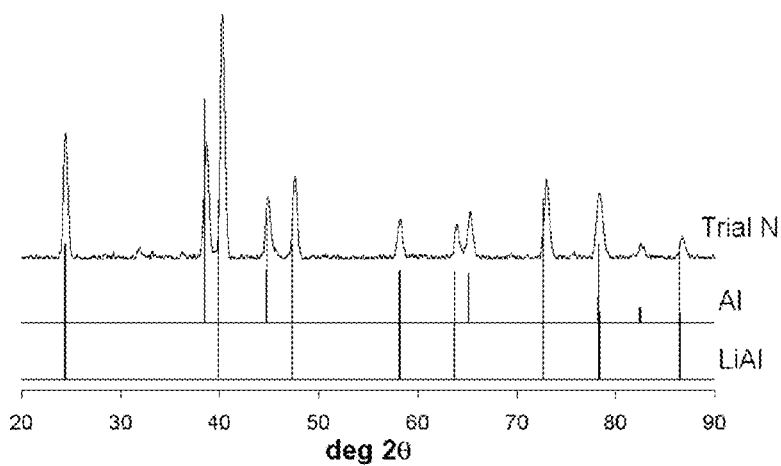
FIG. 10 shows x-ray diffraction patterns of the product of the reaction of $AlCl_3$ with 4 eq of Li powder, for the experiment described in Table 1 as Trial N.
Figure 11:
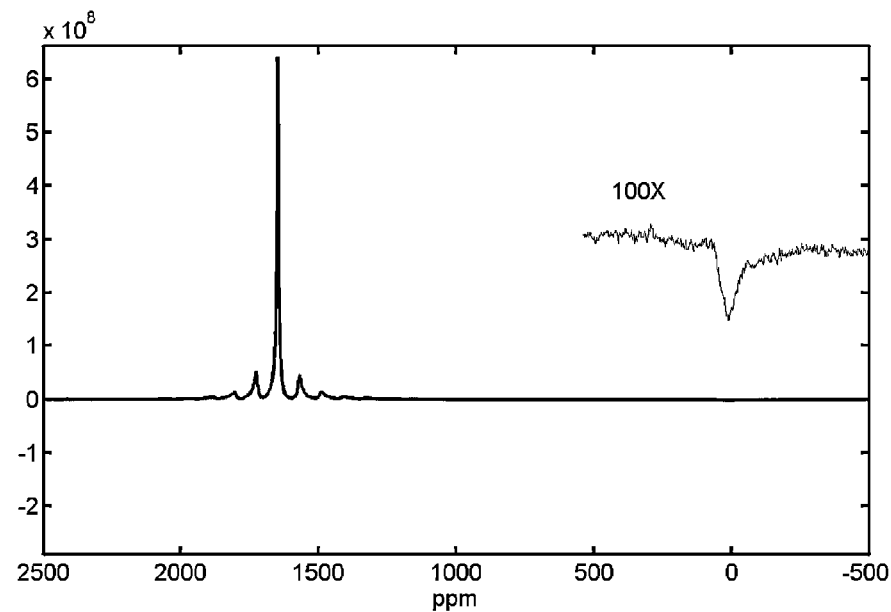
FIG. 11 shows $^{27}Al$ NMR spectra of the Al nanoparticles produced according to trial B of Table 1.
Figure 12:
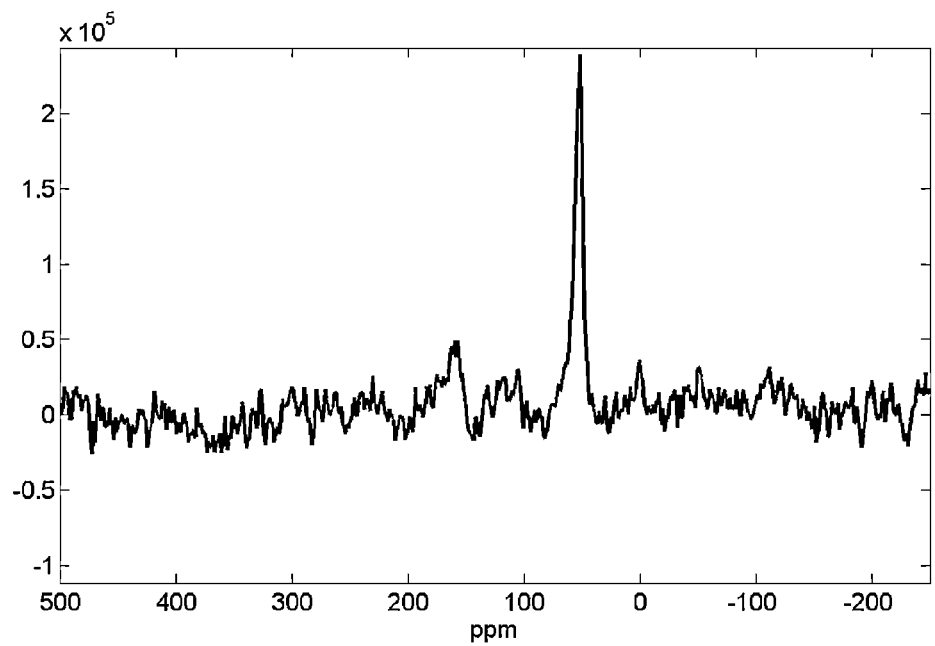
FIG. 12 shows the $^7$Li NMR spectrum of the Al nanoparticles produced according to trial B of Table 1.
Figure 13:
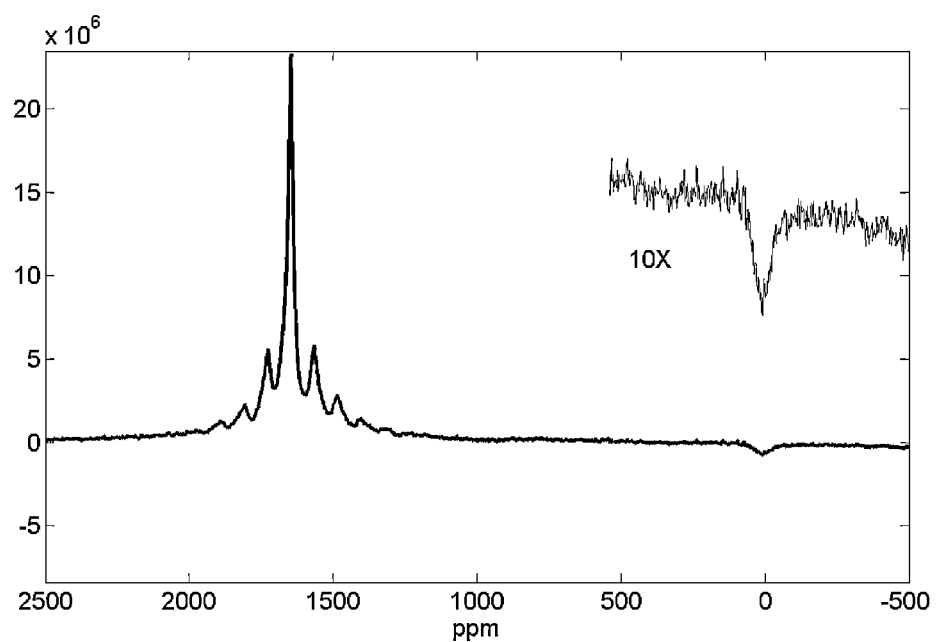
FIG. 13 shows a $^{27}$Al NMR spectrum of the Al nanoparticles produced according to Trial F of Table 1.
Figure 14:
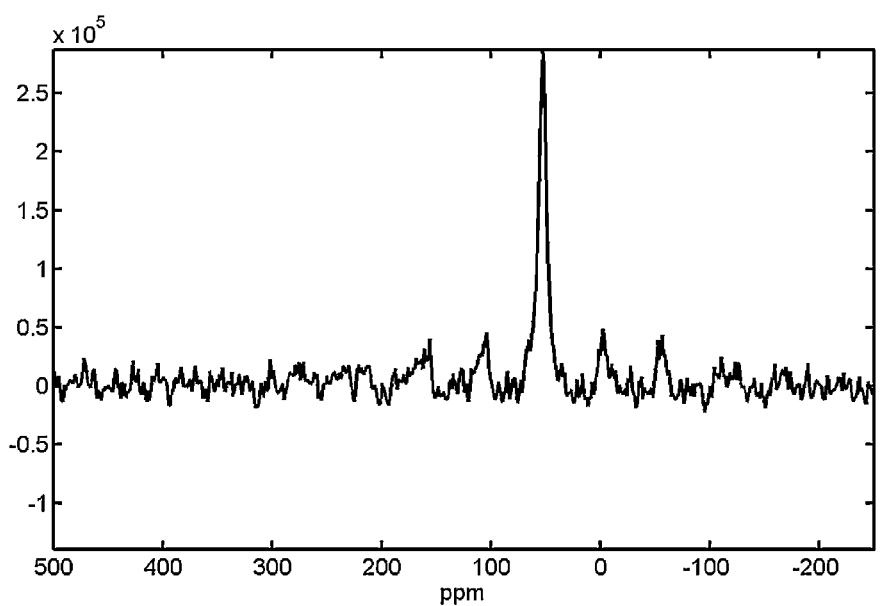
FIG. 14 shows the $^7$Li NMR spectrum of the Al nanoparticles produced according to Trial E of Table 1.
Figure 15:
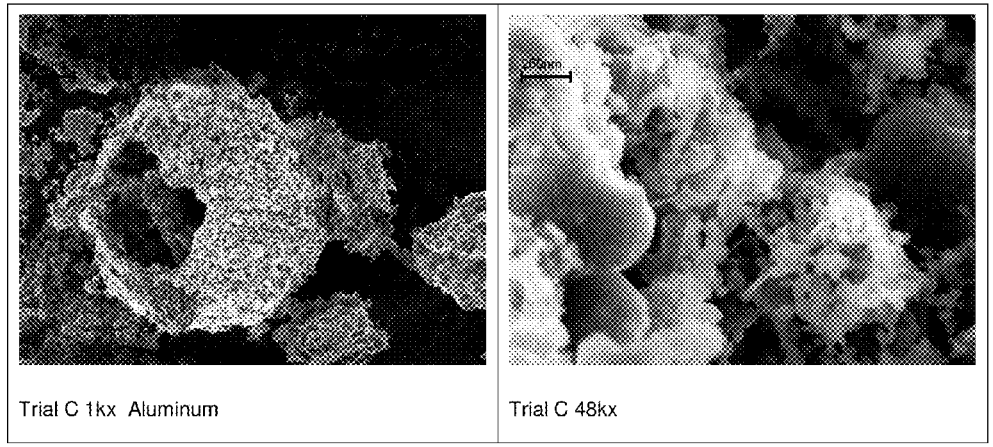
FIG. 15 shows a low magnification and a high magnification SEM image for the products of Trial C of Table 1.
Figure 16:
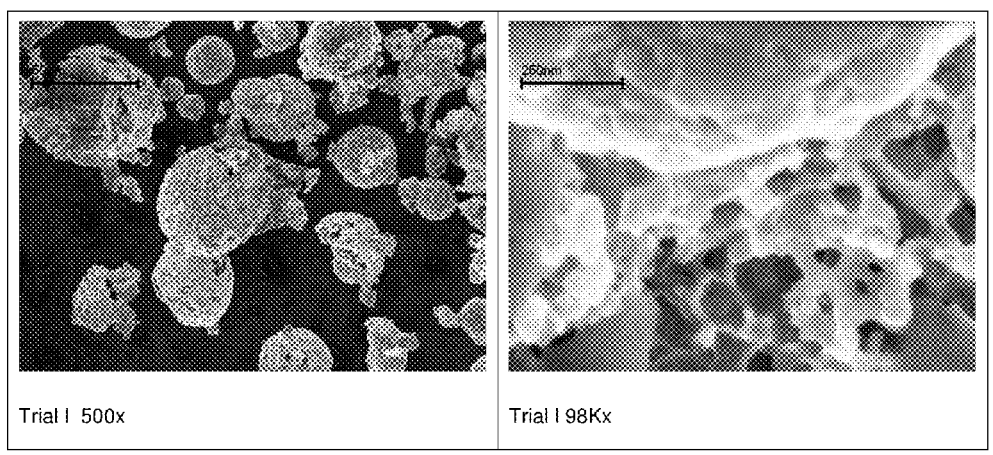
FIG. 16 shows a low magnification and a high magnification SEM image for the products of Trial I of Table 1.
Figure 17:
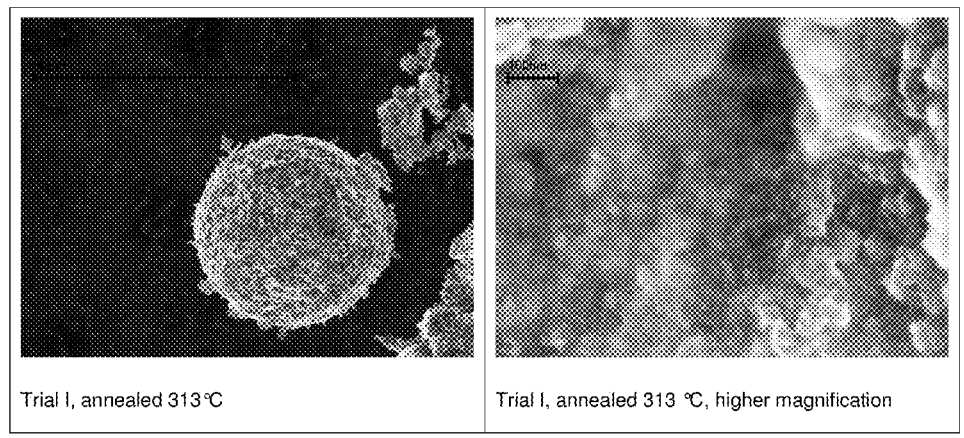
FIG. 17 shows a low magnification and a high magnification SEM image for the products of Trial I annealed at 313° C., of Table 1.
Figure 18:
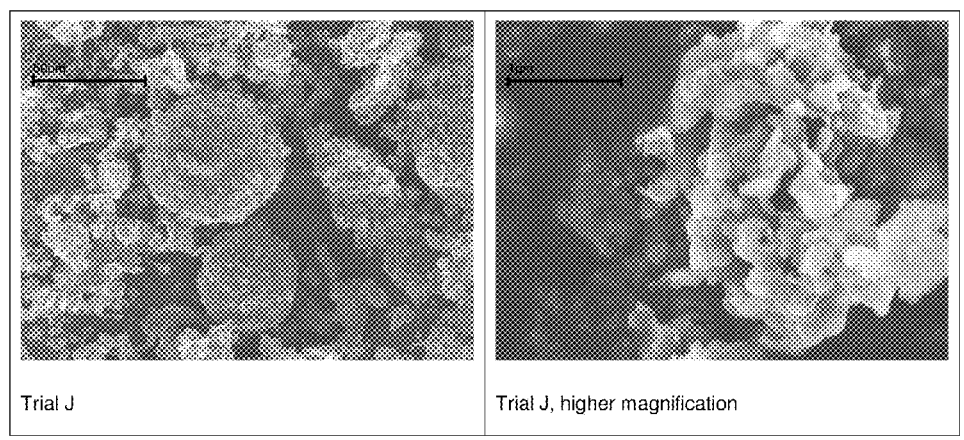
FIG. 18 shows a low magnification and a high magnification SEM image for the products of Trial J of Table 1.
Figure 19:
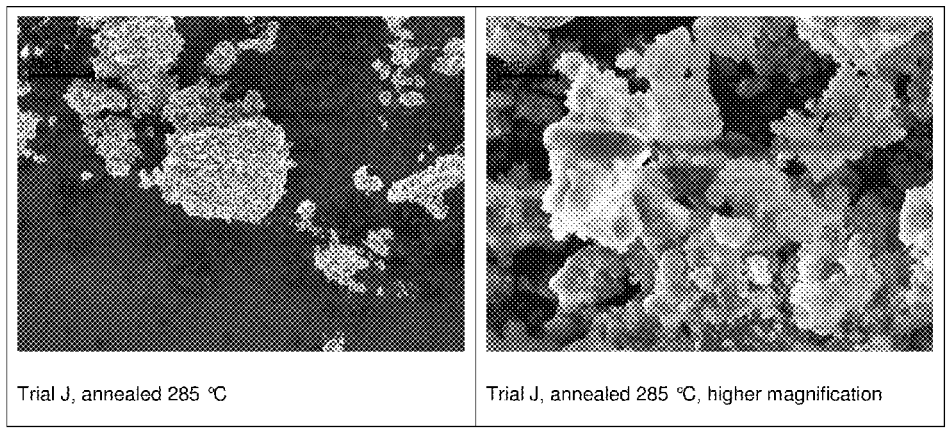
FIG. 19 shows a low magnification and a high magnification SEM image for the products of Trial J annealed at 285° C., of Table 1.
Figure 20:
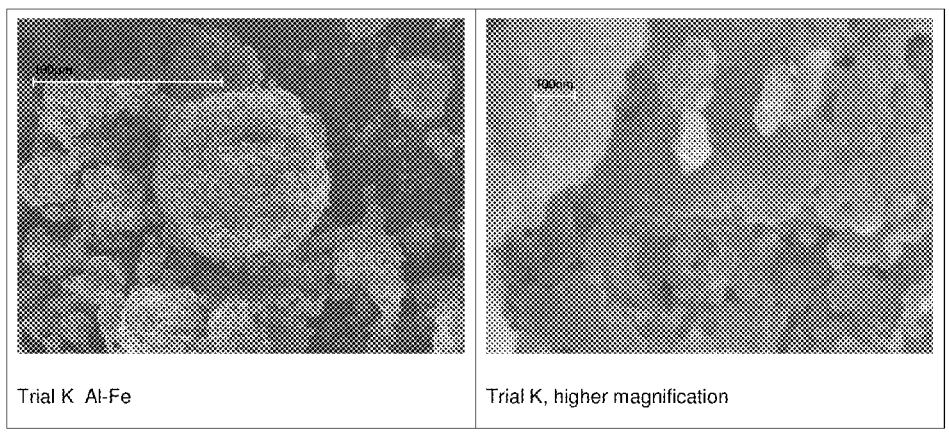
FIG. 20 shows a low magnification and a high magnification SEM image for the products of Trial K of Table 1.
Figure 21:
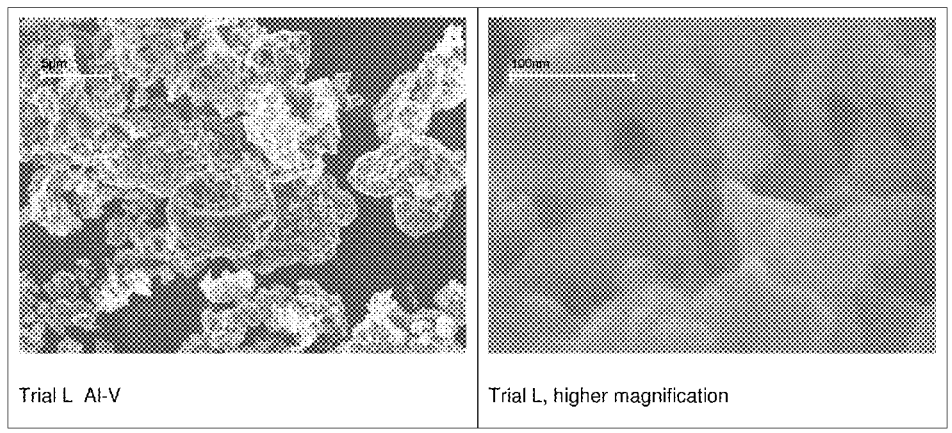
FIG. 21 shows a low magnification and a high magnification SEM image for the products of Trial L.
Figure 22:
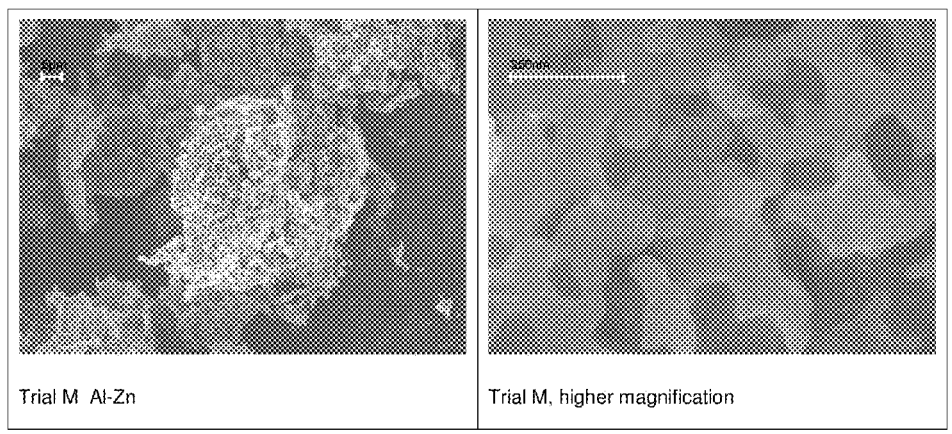
FIG. 22 shows a low magnification and a high magnification SEM image for the products of Trial M.

The synthesis of LiAl nanomaterial using 4 eq of lithium powder is shown in trial N, and its XRD powder pattern is shown in FIG. 10. FIGS. 11-12 show $^{27}Al$ and $^7Li$ NMR spectra of the Li reduction products for trial B, and FIGS. 13-14 show an NMR graph of the Li reduction products for trial F.

Example 4

Additives containing other metals were co-reduced with aluminum chloride in trials I-M. The lithium powder was added to a solution of the halides in trials I and J, and in trials K-M the solution of the halides was added to a slurry of Li powder and about half of the solvent. The LiCl and other byproducts were removed as described in Trial C, with 7-10 washings with THF. In Trials J and K, a portion of the product was heat treated to about 300° C. under vacuum which removed excess residual silicon chlorides and lithium alkoxyborates. Heat treatment (annealing) also caused the Aluminum particles to grow in size. The XRD patterns are shown in FIG. 9, and the SEM images of these products are shown in FIGS. 15-22. The XRD patterns show aluminum in all cases, and Trial K shows aluminum, iron, and iron-aluminum intermetallics. The XRD pattern of trial M shows aluminum and zinc. The XRD pattern of the material as made in Trial I shows only aluminum, but after annealing to 313° C., the XRD pattern shows both aluminum and silicon.

TABLE 1

Aluminum Nanoparticles and Synthesis Materials

| Trial | Al Halide (g) | | Additive (g) | Lithium Powder (g) | Solvent (mL) | Yield (g) | XRD Aluminum Particle Size (nm) | SEM Particle Size (nm) |
|---|---|---|---|---|---|---|---|---|
| A | $AlBr_3$ | 1.02 | N/A | N/A | 0.088 | 10 | 0.09 | 190 | 50-320 |
| B | $AlCl_3$ | 1.00 | N/A | N/A | 0.16 | 15 | 0.19 | 190 | 50-320 |
| C | $AlCl_3$ | 10.0 | N/A | N/A | 1.537 | 75 | 1.801 | 104 | 50-250 |
| D | $AlBr_3$ | 1.00 | $LiOCEt_3$ | 0.46 | 0.083 | 20 | 0.08 | 30-40 | 20-30 |
| E | $AlBr_3$ | 1.06 | $LiOCMe_3$ | 0.32 | 0.088 | 20 | 0.15 | 19 | 40-200 |
| F | $CH_2(AlBr_2)_2$ | 2.00 | N/A | N/A | 0.145 | 25 | 0.22 | 23 | 25-100 |
| G | $AlCl_3$ | 0.57 | $Al(NMe_2)_3$ | 0.28 | 0.130 | 15 | 0.10 | 32 | 15-30 |
| H | $AlCl_3$ | 0.46 | $AlMes_3$ | 0.25 | 0.068 | 15 | 0.13 | 50 | 25-35 |
| I | $AlCl_3$ | 5.11 | $SiCl_4$ | 2.40 | 1.21 | 75 | 1.762 | 27, 53 (313° C. anneal) | 25-75, 40 |
| J | $AlCl_3$ | 7.00 | $B(OEt)_3$ | 2.58 | 1.46 | 100 | 3.08 | 18, 27 (285° C. anneal) | 100-200, 150-300 |
| K | $AlCl_3$ | 7.00 | $FeCl_3$ | 2.84 | 1.46 | 100 | 2.29 | 32 | 15-100 |

TABLE 1-continued

Aluminum Nanoparticles and Synthesis Materials

| Trial | Al Halide (g) | | Additive (g) | | Lithium Powder (g) | Solvent (mL) | Yield (g) | XRD Aluminum Particle Size (nm) | SEM Particle Size (nm) |
|---|---|---|---|---|---|---|---|---|---|
| L | AlCl$_3$ | 10.0 | VCl$_3$ | 0.35 | 1.70 | 150 | 1.58 | 60 | 30-100 |
| M | AlCl$_3$ | 8.00 | ZnCl$_2$ | 2.00 | 1.46 | 100 | 2.42 | 40, Zn 60 | 20-170 |
| N | AlCl$_3$ | 4.00 | N/A | N/A | 0.85 | 25 | 0.77 | 33, AlLi 41 | ND |
| O | AlBr3 | 2.00 | N/A | N/A | 0.16 | 40 Toluene | | 170 Al, 100 AlLi | ND |

The solvent is diethyl ether except where noted in Trial O.
N/A = not applicable and ND = not determined.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for producing metal nanoparticles comprising:
   a) combining an metal halide starting material, lithium and an ethereal or hydrocarbon solvent for the metal halide starting material to form a mixture, wherein the ethereal solvent is selected from the group consisting of diethyl ether, dimethyl ether, monoglyme, and diglyme; and
   b) forming metal nanoparticles from said mixture,
   wherein the metal halide starting material is selected from the group consisting of AlBr$_2$OCMe$_3$, AlBr$_2$OCEt$_3$, CH$_2$(AlBr$_2$)$_2$, AlCl$_2$NMe$_2$, MesitylAlCl$_2$ and AlCl$_2$OEt.

* * * * *